July 16, 1963   J. BAJER   3,097,840
SPRING MOUNTING MEANS
Filed July 1, 1960

JACQUES BAJER
INVENTOR.

BY John R. Faulkner
Clifford L. Sadler

ATTORNEYS

3,097,840
SPRING MOUNTING MEANS
Jacques Bajer, Dearborn, Mich., assignor to Ford Motor Company, Dearborn, Mich., a corporation of Delaware
Filed July 1, 1960, Ser. No. 40,270
7 Claims. (Cl. 267—52)

The present invention relates to suspension systems and more particularly to means for connecting longitudinally extending leaf type suspension springs to transversely arranged axle housings.

It is conventional practice in motor vehicles to have a pair of parallel longitudinally extending leaf springs that are associated with a rigid axle housing and to have a rigid supporting connection between the approximate midpoint of the springs and the housing. Unfortunately, with this arrangement road shocks are transferred directly from the wheels through the axle housing to the leaf springs. As the springs are connected to the passenger carrying vehicle body, such transmission of vibrations is objectionable.

The present invention provides an improvement in means for connecting leaf springs to axle housings so that minor road shocks will cause the axle to move slightly fore and aft relative to the springs. In other words, the road wheels will be able to "give" as they strike obstacles in the road. This ability of the wheels to move fore and aft is sometimes described as wheel compliance. Such action reduces ride harshness of a vehicle by minimizing the tendency for shocks to be transmitted through the axle to the springs which support the passenger carrying body.

More specifically, this invention provides a pair of bracket members having arms located at right angles. The brackets are welded to an axle housing so that one set of arms extends vertically downward and the other extends horizontally forward. A leaf spring is situated between the depending bracket arms and is fitted with upper and lower clamp devices. The depending arms of the brackets are pivotally secured to the lower clamp by a rubber bushing. The horizontal arms are secured by a second rubber bushing to an extension of the upper bracket.

The lower spring clamping plate provides an elastic pivot about which the rear wheels oscillate. To react the forces, the second elastic pivot located horizontally from the axis of the axle tube is provided. This pivot has the function of controlling the axle windup and the amount of fore and aft flexibility. The device is so conceived that a minimum of parts is required and it can be fitted in a limited space.

Other objects and advantages of the present invention will become amply clear from the following description and accompanying drawings, in which.

Figure 1:
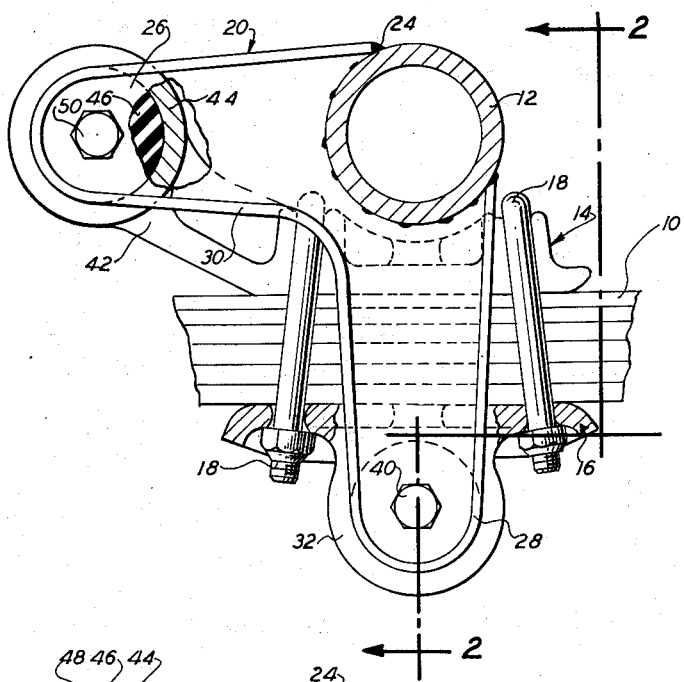
FIGURE 1 is a side elevational view partly in section of a device for attaching an axle housing to leaf springs.
Figure 2:
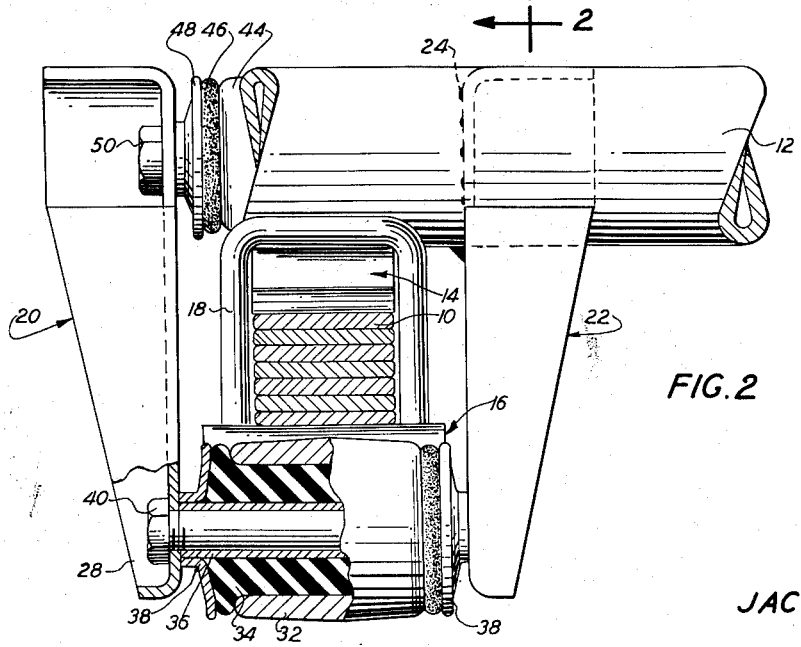
FIGURE 2 is a rear elevational view in section taken along section lines 2—2 of FIGURE 1.

Referring now to the drawings for a more complete understanding of this invention, FIGURE 1 discloses a plurality of longitudinal leaf springs 10 that are joined to an axle housing or tube 12. The tube 12 rotatably carries a wheel supporting axle (not shown). The leaf springs 10 are stacked one on top of another and are held between an upper clamping plate 14 and a lower clamping plate 16 by a pair of U-bolts 18.

A pair of bracket members 20 and 22 are secured to the axle tube 12 by weldments such as at 24. The brackets 20, 22 are of a generally right angle shape with a forwardly extending horizontal arm 26 and a downwardly extending vertical arm 28. The brackets 20, 22 are stamped metal pieces with reinforcing peripheral flanges such as 30.

The lower clamp 16 is a casting having an integral tubular portion 32 situated on its under side. A cylindrical rubber bushing 34 is positioned concentric within the tubular portion 32 and a metal tube 36 is placed coaxial within the bushing 34. A pair of washers 38 are located over the exposed ends of the tubes 36 and flush against the ends of the rubber bushing 34.

A bolt 40 is passed between the ends of the depending arms 20, 22 as well as through the center of the tube 36. When the bolt 40 is tightened, the washers 38 press against the bushing 34 and compresses the rubber. The length of the tube 36 determines the extent to which the rubber is preloaded and this in turn determines the flexibility of the bushing assembly.

The upper clamp 14 is a forging and has an upwardly and forwardly extending portion 42. The extending portion 42 terminates with a cylindrical end 44 that houses a bushing similar in construction to the one of the lower clamp 14. A cylindrical rubber piece 46 is positioned within the end 44 of the clamp 14. A tubular metal member (not shown) is concentric within the rubber bushing 46. A pair of washers 48 are placed over the ends of the metal tube and flush against the exposed ends of the rubber bushing 46. A bolt 50 spans the ends of the forwardly extending arms 26 and passes through the center of the washers 48, bushing 46, and the metal tube situated therein. When the bolt 50 is tightened, the rubber 46 is preloaded by compression.

During the operation of a vehicle having the above described suspension structure a significant reduction of ride harshness will be noticed. If the wheels of the vehicle should strike an obstacle, the axle housing 12 that journals the wheel will be permitted slight fore and aft movement as determined by the flexibility of the rubber bushings 34 and 46. The brackets 20, 22 will tend to pivot about the axis of the lower bolt 40. The forward rubber bushing 46 will determine the permissible movement.

The foregoing description constitutes the preferred embodiment of this invention. Modifications and alterations may occur to those skilled in the art which will come within the scope and spirit of the following claims.

I claim:

1. An axle housing, a leaf spring and a suspension device for connecting an axle housing to a leaf spring comprising a right angle bracket secured to said housing, said bracket having horizontal and vertical arms, upper and lower clamping devices, said spring being disposed between and secured to said upper and lower clamping devices, one of said arms being pivotally connected to one of said clamping devices and the other of said arms being pivotally connected to the other of said clamping devices.

2. An axle housing, a leaf spring and a suspension device for connecting said axle housing to said leaf spring comprising a pair of arms secured to said housing, said spring having a portion adapted to traverse a jounce and rebound path, a pair of clamps secured to said spring portion, the extremity of one of said arms being directly connected to one of said clamps by an elastic bushing and the other of said arms being directly connected to the other of said clamps by an elastic bushing.

3. A suspension device for connecting an axle housing to a leaf spring comprising a horizontal arm secured to said housing, a vertically depending arm secured to said housing, upper and lower clamping devices secured to said spring, said lower device being connected to said depending arm by an elastic bushing situated beneath said lower device, and said horizontal arm being connected to said upper device by an elastic bushing situated horizontally from the axis of said housing and above said spring.

4. An axle housing, a leaf spring and a suspension device for connecting an axle housing to a leaf spring comprising a horizontal arm secured to said housing and a vertically depending arm secured to said housing, upper and lower clamping devices secured to said spring, said lower device being directly connected to said depending arm, and said horizontal arm being directly connected to said upper device by an elastic bushing situated horizontally from the axis of said housing and above said spring.

5. An axle housing, a leaf spring and a suspension device for connecting an axle housing to a leaf spring comprising a horizontal arm secured to said housing and a vertically depending arm secured to said housing, upper and lower clamping devices secured to said spring, said lower device being directly connected to said depending arm by an elastic bushing situated beneath said device, said said horizontal arm being directly connected to said upper device.

6. An axle housing, a leaf spring and a suspension device for connecting an axle housing to a leaf spring comprising a right angle bracket secured to said housing, said bracket having horizontal and vertical arms, upper and lower clamping devices, said spring being disposed between and secured to said upper and lower clamping devices, one of said arms being yieldably connected to one of said clamping devices and the other of said arms being yieldably connected to the other of said clamping devices.

7. A vehicle suspension system having sprung and unsprung components, a suspension means interconnecting said sprung and unsprung components and adapted to permit both jounce and rebound movement and fore and aft movement of said unsprung components relative to said sprung components, said suspension means including a member connected to said sprung components and extending in a direction towards said unsprung components, said member having a portion adapted to traverse a substantially vertical jounce and rebound path, bracket means secured to said unsprung components, said bracket means having first and second arms connected to vertically spaced upper and lower parts of said portion respectively, said last mentioned connections being of the elastic pivot type.

References Cited in the file of this patent

UNITED STATES PATENTS

| | | |
|---|---|---|
| 1,575,118 | Lipcot | Mar. 2, 1926 |
| 1,781,406 | MacPherson | Nov. 11, 1930 |
| 2,096,530 | Alden | Oct. 19, 1937 |
| 2,274,518 | Baker | Feb. 24, 1942 |
| 2,309,812 | Utz | Feb. 2, 1943 |
| 2,621,920 | Hogsten et al. | Dec. 16, 1952 |
| 2,762,445 | Polhemus et al. | Sept. 11, 1956 |